United States Patent
Muff et al.

(10) Patent No.: US 9,632,786 B2
(45) Date of Patent: Apr. 25, 2017

(54) INSTRUCTION SET ARCHITECTURE WITH EXTENDED REGISTER ADDRESSING USING ONE OR MORE PRIMARY OPCODE BITS

(75) Inventors: Adam J. Muff, Rochester, MN (US); Paul E. Schardt, Rochester, MN (US); Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1146 days.

(21) Appl. No.: 13/330,804

(22) Filed: Dec. 20, 2011

(65) Prior Publication Data
US 2013/0159676 A1 Jun. 20, 2013

(51) Int. Cl.
*G06F 9/34* (2006.01)
*G06F 9/30* (2006.01)

(52) U.S. Cl.
CPC ...... *G06F 9/30185* (2013.01); *G06F 9/30101* (2013.01); *G06F 9/30138* (2013.01); *G06F 9/30189* (2013.01); *G06F 9/342* (2013.01)

(58) Field of Classification Search
CPC .................. G06F 9/30185; G06F 9/00–9/3897
USPC ........................................ 712/208, 209, 226
See application file for complete search history.

(56) References Cited

U.S. PATENT DOCUMENTS

| | | | | |
|---|---|---|---|---|
| 4,713,749 | A * | 12/1987 | Magar et al. | 712/241 |
| 4,750,112 | A * | 6/1988 | Jones et al. | 712/217 |
| 5,574,873 | A * | 11/1996 | Davidian | 712/200 |
| 6,651,160 | B1 * | 11/2003 | Hays | 712/210 |
| 7,930,162 | B1 * | 4/2011 | Chan et al. | 703/14 |
| 2001/0025337 | A1 * | 9/2001 | Worrell et al. | 712/209 |
| 2004/0186981 | A1 * | 9/2004 | Christie et al. | 712/210 |
| 2004/0250051 | A1 * | 12/2004 | Seal et al. | 712/226 |
| 2007/0124566 | A1 * | 5/2007 | Cohen | 712/208 |
| 2009/0172367 | A1 * | 7/2009 | Yoshida et al. | 712/225 |
| 2011/0238953 | A1 * | 9/2011 | Metsugi et al. | 712/207 |
| 2012/0265967 | A1 * | 10/2012 | Gschwind et al. | 712/210 |

* cited by examiner

*Primary Examiner* — Keith Vicary
(74) *Attorney, Agent, or Firm* — Middleton Reutlinger

(57) ABSTRACT

A method and circuit arrangement selectively repurpose bits from a primary opcode portion of an instruction for use in decoding one or more operands for the instruction. Decode logic of a processor, for example, may be placed in a predetermined mode that decodes a primary opcode for an instruction that is different from that specified in the primary opcode portion of the instruction, and then utilize one or more bits in the primary opcode portion to decode one or more operands for the instruction. By doing so, additional space is freed up in the instruction to support a larger register file and/or additional instruction types, e.g., as specified by a secondary or extended opcode.

24 Claims, 6 Drawing Sheets

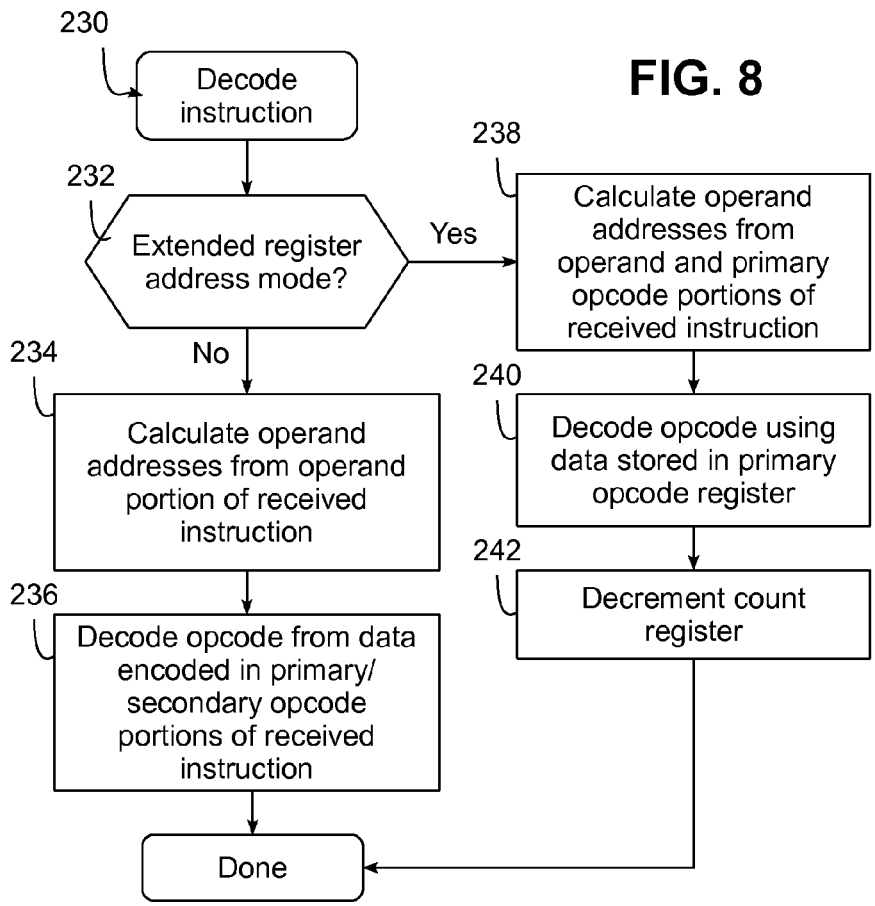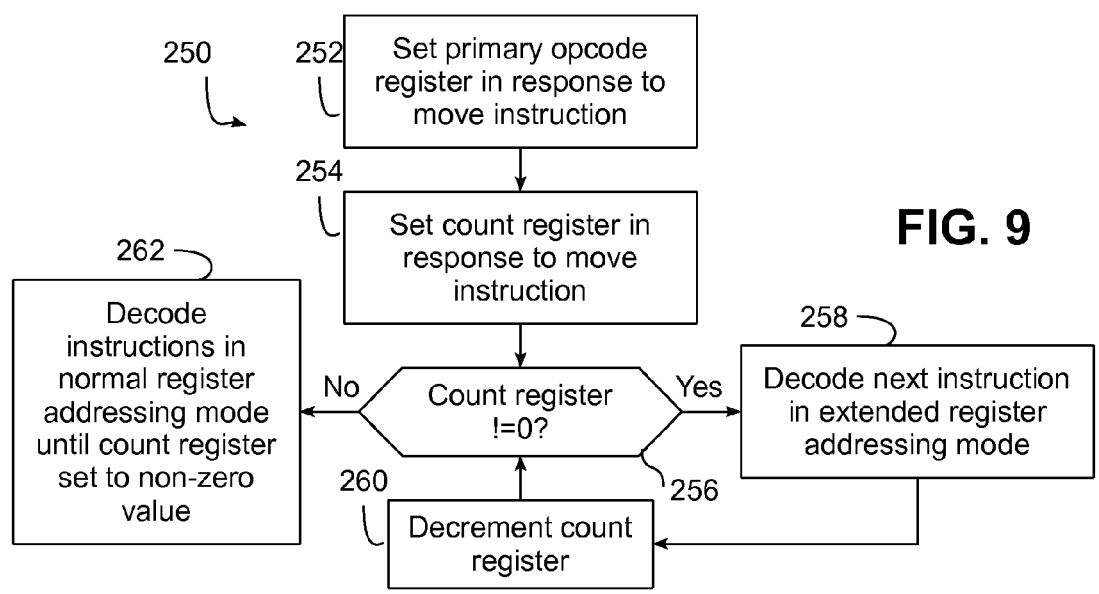

INSTRUCTION SET ARCHITECTURE WITH EXTENDED REGISTER ADDRESSING USING ONE OR MORE PRIMARY OPCODE BITS

FIELD OF THE INVENTION

The invention is generally related to data processing, and in particular to instruction set architectures for processors and computers incorporating the same.

BACKGROUND OF THE INVENTION

The fundamental task of every computer processor is to execute computer programs. How a processor handles this task, and how computer programs must present themselves to a processor for execution, are governed by both the instruction set architecture (ISA) and the microarchitecture of the processor. An ISA is analogous to a programming model, and relates principally to how instructions in a computer program should be formatted in order to be properly decoded and executed by a processor, although an ISA may also specify other aspects of the processor, such as native data types, registers, addressing modes, memory architecture, interrupt and exception handling, and external I/O. The microarchitecture principally governs lower level details regarding how instructions are decoded and executed, including the constituent parts of the processor (e.g., the types of execution units such as fixed and floating point execution units) and how these interconnect and interoperate to implement the processor's architectural specification.

An ISA typically includes a specification of the format of each type of instruction that is capable of being executed by a particular processor design. Typically, an instruction will be encoded to include an operational code, or opcode, that identifies the type of instruction, (i.e., the type of operation to be performed when the instruction is executed), as well as one or more operands that identify input and/or output data to be processed by the instruction. In many processor designs, for example Reduced Instruction Set Computer (RISC) and other load-store designs, data is principally manipulated within a set of general purpose registers (GPR's) (often referred to as a "register file"), with load and store instructions used to respectively retrieve input data into GPR's from memory and store result or output data from GPR's and back into memory. Thus, for a majority of the instructions that manipulate data, the instructions specify one or more input or source registers from which input data is retrieved, and an output or destination register to which result data is written.

Instructions are typically defined in an ISA to be a fixed size, e.g., 32 bits or 64 bits in width. While multiple 32 or 64 bit values may be used to specify an instruction, the use of multiple values is undesirable because the multiple values take more time to propagate through the processor and significantly increase design complexity. With these fixed instruction widths, only a limited number of bits are available for use as opcodes and operands.

Each unique instruction type conventionally requires a unique opcode, so in order to support a greater number of instruction types (a continuing need in the industry), additional bits often must be allocated to the opcode portion of an instruction architecture. In some instances, opcodes may be broken into primary and secondary opcodes, with the primary opcode defining an instruction type and the secondary opcode defining a subtype for a particular instruction type; however, even when primary and secondary opcodes are used, both opcodes occupy bit positions in each instruction.

Likewise, a continuing need exists for expanding the number of registers supported by an ISA, since improvements in fabrication technology continue to enable greater numbers of registers to be architected into an integrated circuit, and in general performance improves as the number of registers increases.

Each register requires a unique identifier as well, so as the number of registers increases, the number of bit positions in each instruction required to identify all supported registers likewise increases.

As an example, consider a processor architecture that supports 32-bit instructions with 6-bit primary opcode fields, and thus supports a total of 64 types, or classes of instructions. If, for example, it is desirable to implement within this architecture a class of instructions that identifies up to three source registers and a separate destination register from a register file of 64 registers, each operand requires a 6-bit operand field. As such, 6 bits are needed for the primary opcode, 18 bits are needed for the source register addresses and 6 bits are needed for the target register address, leaving only 2 bits for an extended opcode, and allowing for only four possible instructions in this instruction class.

Implementing a register file of 128 registers using 32-bit instructions is even more problematic. If, for example, some of the instructions in a class of an instruction set architecture required three source registers and one target register, the operands would require 28 bits (7 bits per operand), only four bits would be available for any primary and/or secondary opcode. Thus, for example, if four bits were required for a primary opcode to identify a particular instruction class, that instruction class would be limited to a single instruction, since there would be no space for any secondary or extended opcode.

In most instances, however, more instruction types are needed for an architecture to be useful. For instance, an instruction class for performing floating point operations may need instruction types that perform addition, subtraction, multiplication, fused multiply-add operations, division, exponentiation, trigonometric operations, comparison operations, and others.

Conventional attempts have been made to address these limitations. For example, three-source operations may be made destructive, meaning the target and one source address would be implicitly equal, such that one address field in the above example would not be needed, freeing up space for additional extended opcodes. Destructive operations, however, are often not convenient for compilers and software engineers, because often times an extra copy of the source data that would be overwritten by the destructive operation needs to be saved away in a temporary register, which can have potential performance problems in addition to using valuable temporary register space.

Therefore, a significant need continues to exist in the art for a manner of increasing the number and complexity of instructions supported by an instruction set architecture.

SUMMARY OF THE INVENTION

The invention addresses these and other problems associated with the prior art by providing a method and circuit arrangement that selectively repurpose bits from a primary opcode portion of an instruction for use in decoding one or more operands for the instruction. Decode logic of a processor, for example, may be placed in a predetermined mode that decodes a primary opcode for an instruction that is different from that specified in the primary opcode portion of the instruction, and then utilize one or more bits in the primary opcode portion to decode one or more operands for the instruction. By doing so, additional space is freed up in the instruction to support a larger register file and/or additional instruction types, e.g., as specified by a secondary or extended opcode.

In one embodiment consistent with the invention, for example, a processor may support a primary opcode register that stores a primary opcode and a count register that stores a count specifying the number of instructions that should be decoded using the primary opcode stored in the primary opcode register. Once these registers are written to, the processor may be set to an extended register addressing mode in which subsequent instructions in an instruction stream are decoded using the primary opcode stored in the primary opcode register, and the data encoded in the primary opcode portions of such instructions is used to define the most significant bits of one or more operands of the instructions. Such a design may support, for example, a 32-bit instruction format with a 5-bit primary opcode field, three 7-bit source operands and one 7-bit destination operand (thereby supporting 128 addressable registers) and a 3- or 4-bit secondary opcode. It will be appreciated, however, that the invention is not limited to such an embodiment.

Therefore, consistent with one aspect of the invention, an instruction set architecture defines a primary opcode portion and an operand portion for each instruction in the instruction set architecture. In response to receiving a first instruction in an instruction stream, the first instruction is decoded using decode logic to determine a primary opcode for the first instruction from data encoded in the primary opcode portion thereof, and a predetermined mode is enabled for the decode logic. In response to receiving a second instruction in the instruction stream, a determination is made that the predetermined mode is enabled, and in response to determining that the predetermined mode is enabled, a primary opcode is decoded for the second instruction that is different from that defined in the primary opcode portion of the second instruction, and at least one operand is decoded for the second instruction using data encoded in the primary opcode portion of the second instruction. The second instruction is then executed based upon the decoded primary opcode and at least one operand thereof.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 8 is a flowchart illustrating an exemplary sequence of operations for decoding instructions in the processor referenced in FIG. 7.

FIG. 9 is a flowchart illustrating an exemplary sequence of operations performed to execute instructions from an exemplary instruction stream in the processor referenced in FIG. 7.

DETAILED DESCRIPTION

Figure 1:
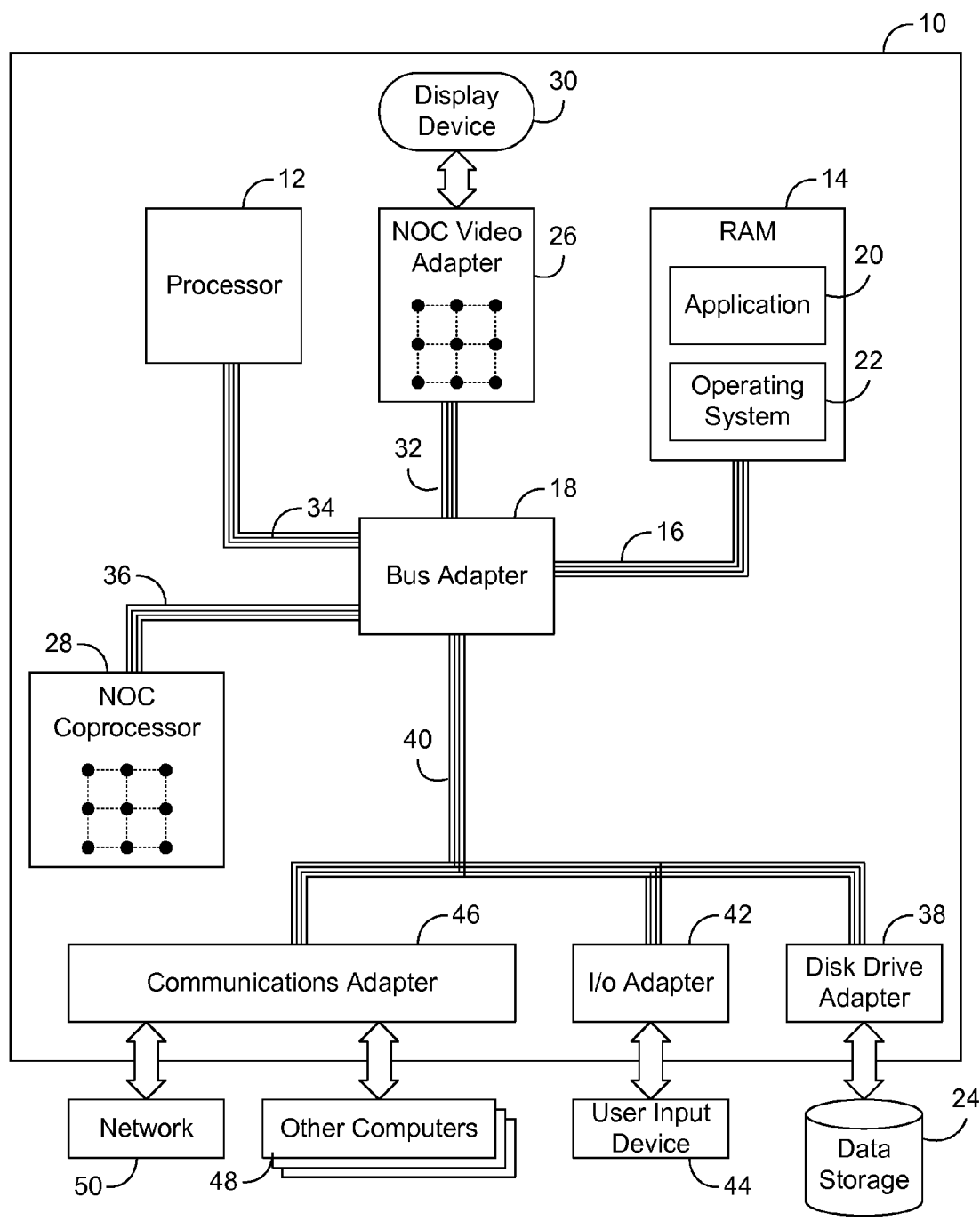
FIG. 1 is a block diagram of exemplary automated computing machinery including an exemplary computer useful in data processing consistent with embodiments of the present invention.

Embodiments consistent with the invention selectively repurpose bits from a primary opcode portion of an instruction for use in decoding one or more operands for the instruction. Decoding an instruction generally refers to the operations associated with determining (1) what operation to perform in response to the instruction, (2) what input data (if any) should be used when performing that operation, and/or (3) what should be done with the result of the operation, e.g., where to store output data generated as a result of the operation.

As is well understood in the art, instructions are typically defined in an instruction set architecture (ISA), and that instructions typically include encoded data that specifies an operation to be performed, typically represented by an opcode, and one or more source and destination operands, often taking the form of addresses of registers in a register file. An opcode may be partitioned into a primary opcode and a secondary or extended opcode, with the former defining a class of instructions, and the latter defining different instruction types within that class. Typically, all of the instructions in an instruction set architecture will utilize the same number of bits in an instruction for a primary opcode, and then, based upon the number of instruction types supported by a particular instruction class or primary opcode, utilize a variable number of bits in the instruction for a secondary or extended opcode. The bits in an instruction that are allocated to a primary opcode and a secondary opcode will be referred to hereinafter as primary and secondary opcode portions. The remainder of an instruction is typically allocated to one or more operands (the bits for which are referred to herein as the operand portion of the instruction), and may for some instructions (e.g., instructions that only require one or two operands), also include unused space.

Embodiments consistent with the invention, on the other hand, support a predetermined mode, referred to herein as an extended register addressing mode, in which a primary opcode other than that which is defined in the primary opcode portion of an instruction is used as the primary opcode for that instruction. For example, the other primary opcode may be specified by a primary opcode register that may be written to in advance of decoding the instruction, e.g., by an earlier instruction in an instruction stream. The primary opcode portion of the instruction may not be used to decode the operation of the instruction, or alternatively one or more bits encoded in the primary opcode portion may be combined with other data in order to generate the primary opcode for the instruction.

In addition, when one or more bits in the primary opcode portion are not utilized to generate the primary opcode for an instruction, all or a subset of those bits may be repurposed for use in extending the size of the operand portion of the instruction. In one embodiment, for example, a most significant bit (MSB) for each operand register address specified by the instruction may be encoded in the primary opcode portion of the instruction. In other embodiments, however, other operand bits, e.g., other bits of operand register addresses, may be encoded in the primary opcode portion. Furthermore, the number of bits in the primary opcode portion that are allocated to each operand may differ. In addition, in some embodiments, the primary opcode portion may also encode other information, e.g., a portion of a secondary opcode, in addition to operand bits.

As will also become more apparent below, the extended register addressing mode may be enabled or disabled in a number of different manners. In one embodiment, for example, the extended register addressing mode may be selectively enabled based upon a count value stored in a count register. For example, storing a non-zero value N in the count register may cause a processor, or specifically decode logic therein, to decode the next N instructions in an instruction stream in the extended register addressing mode, and then automatically revert to a regular addressing mode after the N instructions have been executed. Thus, the mode may be controlled by the value stored in the count register. Other manners of controlling the mode, e.g., setting a mode flag or other indicator, etc. may also be used.

It will be appreciated that the generation of an instruction stream to make use of an extended register addressing mode may be manually generated by a developer, or alternatively, may be automatically generated by a compiler during compilation of software, e.g., as a potential optimization of developer generated program code. Moreover, the implementation of such an optimization in an optimizing compiler would be well within the abilities of one of ordinary skill in the art having the benefit of the instant disclosure.

Other variations and modifications will be apparent to one of ordinary skill in the art. Therefore, the invention is not limited to the specific implementations discussed herein.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
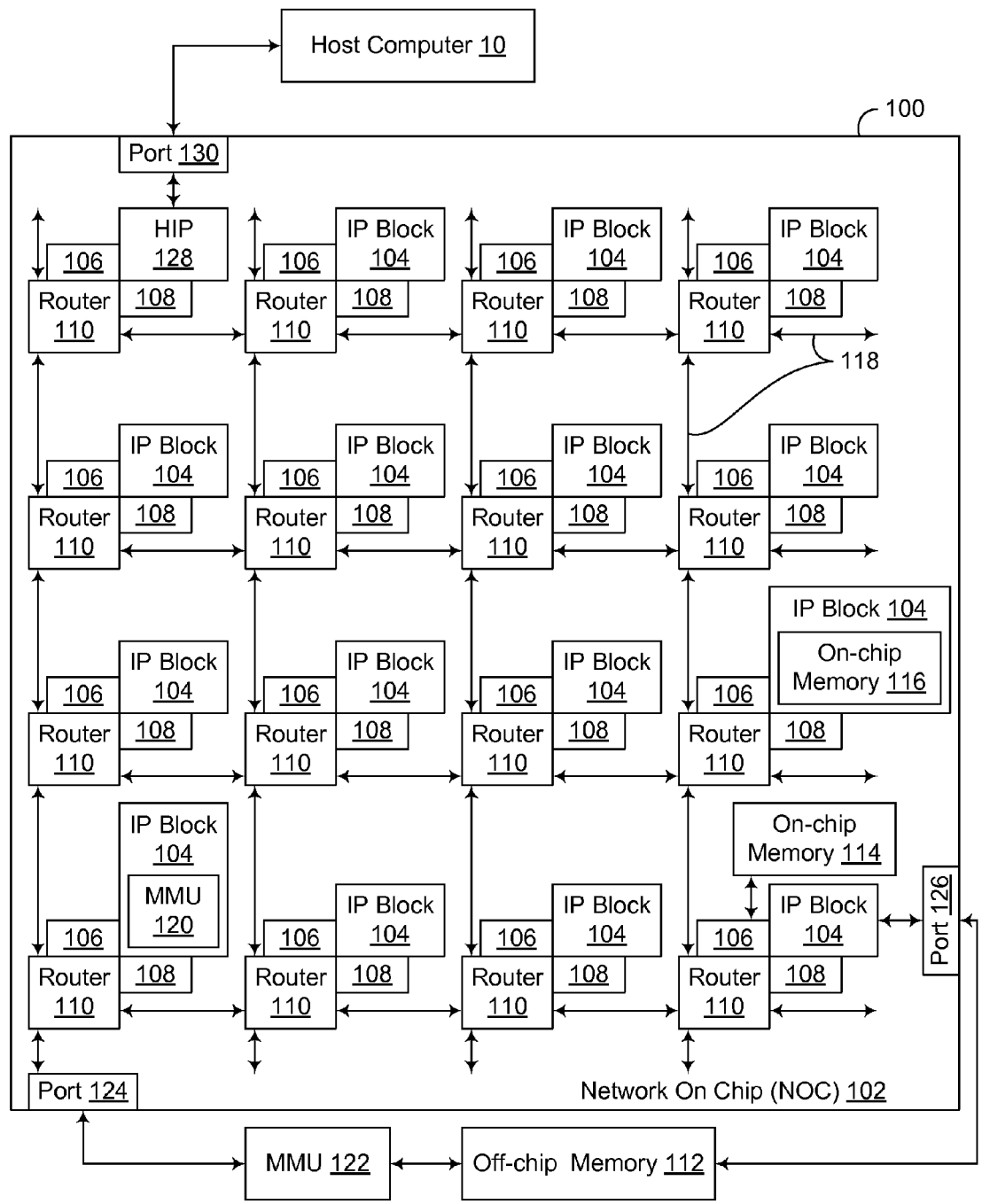
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
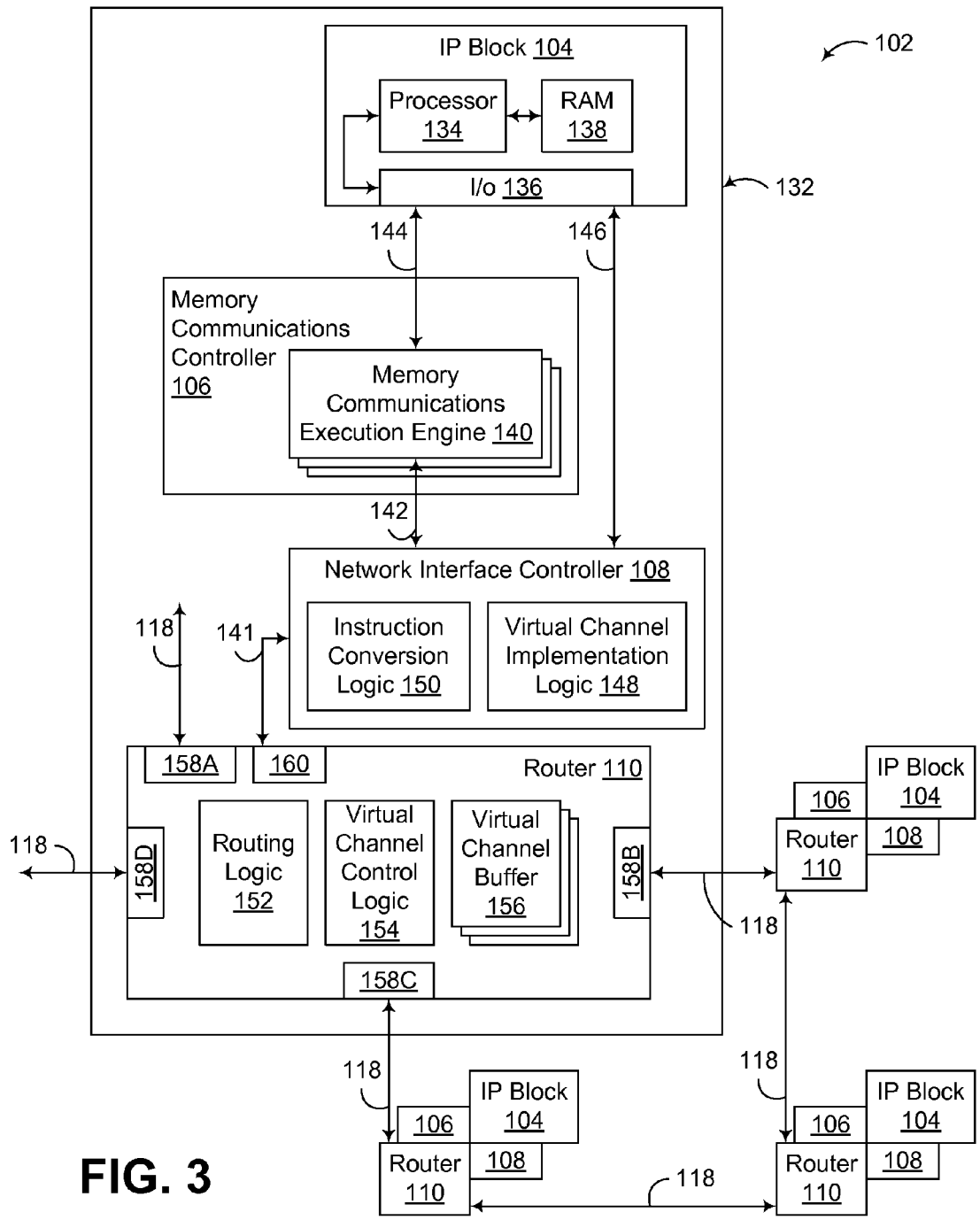
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
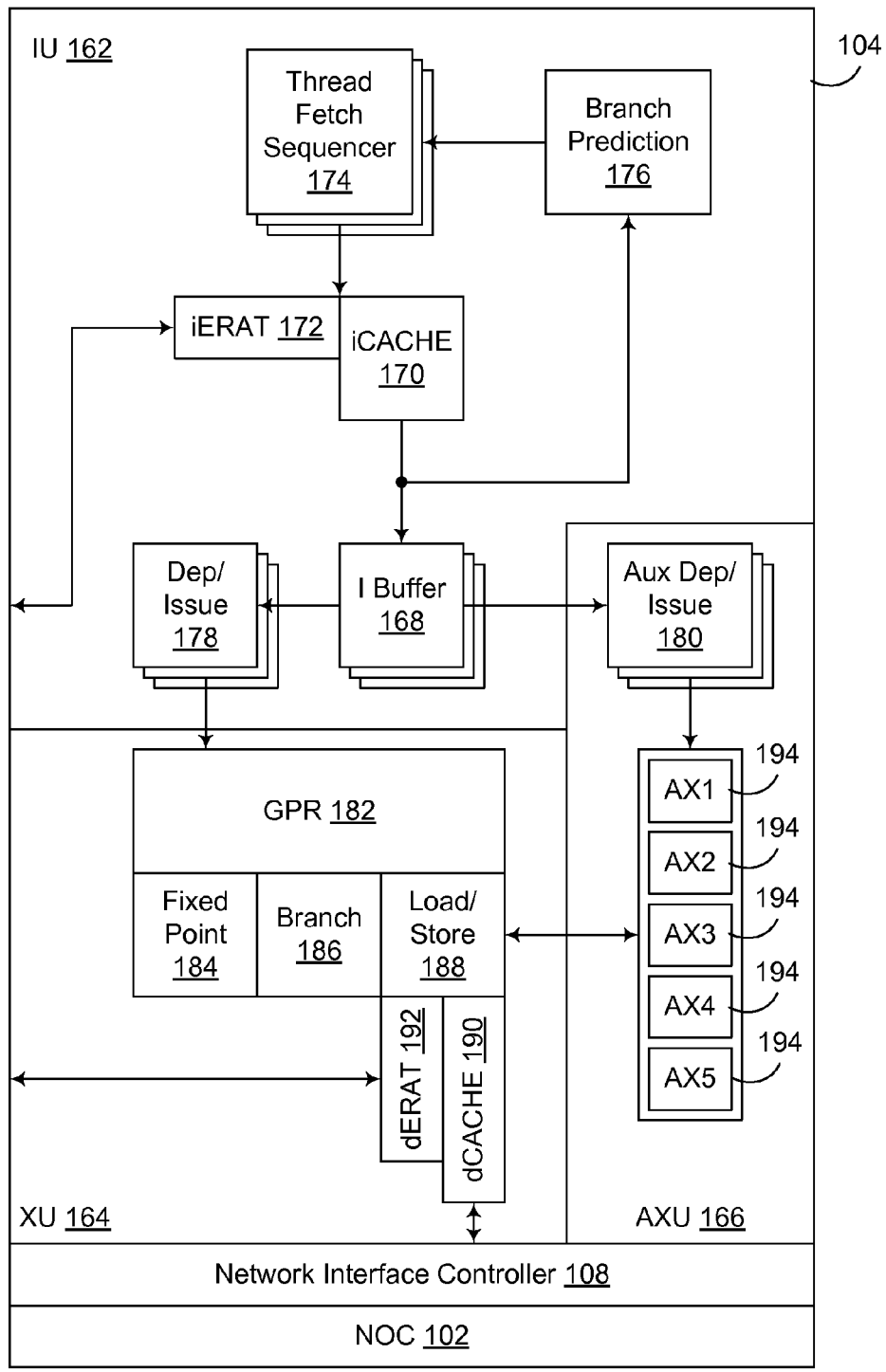
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an issue or instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Instruction Set Architecture with Extended Register Addressing Mode

Processor instructions have an opcode for each type of operation that is represented by a unique bit pattern in the data that makes up the instruction. Due to the ever expanding number of registers in modern processor cores, the address widths present in the instruction encoding continue to widen, taking up valuable instruction encoding space for adding new instruction decodes. Additionally, it is typically desirable that all instructions have the same fixed width in a microprocessor architecture. Introducing variable width instructions often causes great design complexity that would impact performance negatively.

Figures 5, 6, 7:
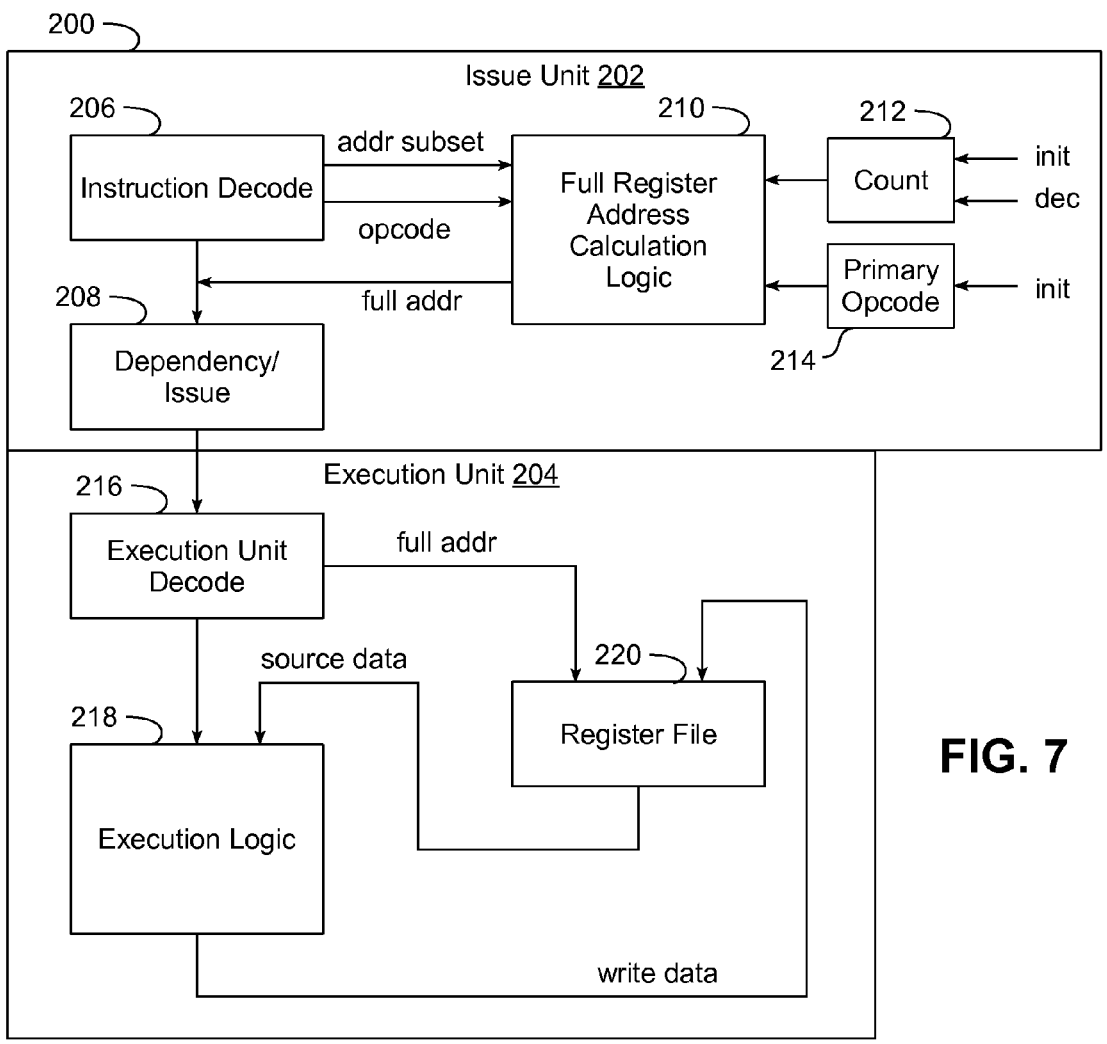
FIG. 5 is an illustration of an instruction format in a normal register addressing mode.
FIG. 6 is an illustration of an instruction format in an extended register addressing mode consistent with the invention.
FIG. 7 is a block diagram of an exemplary processor incorporating an extended register addressing mode consistent with the invention.

If, for example, it was desirable to add a new class of instructions to an instruction set architecture such as the existing Power instruction set architecture to support 128 registers, each address width in the new instructions would equal 7. In addition, if some of the new instructions needed to address three source registers (VA, VB, VC) and one target register (VT), 28 bits, 21 bits for the source register addresses and 7 bits for the target register address, e.g., as illustrated in FIG. 5. Assuming, for example, a 4 bit primary opcode, this would leave no bits for a secondary opcode, allowing for only one possible instruction in this new type of instruction class. However, more instruction types would be needed for such an architecture to be useful.

For instance, it may be desirable for a new instruction class to include instruction types that perform addition, subtraction, multiplication, fused multiply-add operations, division, exponentiation, trigonometric operations, comparison operations, and others. One conventional approach to address this situation would be to make the 3-source operations destructive, meaning the target and one source address would be implicitly equal, such that one address field in the above example would not be needed, freeing up space for additional extended opcodes. But these destructive operations are often not convenient for compilers and software engineers, because often times an extra copy of the source data that would be overwritten by the destructive operation needs to be saved away in a temporary register, which can have potential performance problems in addition to using valuable temporary register space.

One major reason why instruction set architectures strive for large numbers of registers is so that loops can be "unrolled" to minimize branch misprediction performance penalties, and may also in certain cases be used to minimize the performance impact of dependent instructions. The large numbers of registers are needed to do "spills and fills" of data without reusing the same register in a loop. Consider the following example equation (1) where a long Taylor series approximation is computed for sin(x) with many iterations:

$$\sin(x) \approx x - \frac{x^3}{3!} + \frac{x^5}{5!} - \frac{x^7}{7!} + \frac{x^9}{9!} - \frac{x^{11}}{11!} + \frac{x^{13}}{13!} - \frac{x^{15}}{15!} \quad (1)$$

TABLE I

Instruction sequence for Taylor series approximation

```
# initially:
# f1, f2, f10 contain x
# f3, f4, f6, f8 contain 1.0
# f1 contains -1.0
loop:  fmul f2, f1, f2       # f1 contains x, initially f2 contains x also
       fmul f2, f1, f2       # f2 now contains x raised to the desired exp
       fadd f3, f3, f6       # increment the counter, initially contains 1
       fmul f4, f3, f4       # f4 contains the running factorial, init 1
       fadd f3, f3, f6       # increment the counter
       fmul f4, f3, f4       # f4 contains the running factorial
       fdiv f5, f6, f4       # f5 now has the reciprocal of the factorial
       fmul f8, f7, f8       # flip the sign appropriately
       fmul f9, f5, f2       # multiply the reciprocal with the x component
       fmadd f10, f9, f8,    # correct the sign and add to the sum in f10
       f10
       fcmp f3, end          # compare counter (exponent) to end
       blt loop              # branch back to loop if f3 < end
```

Table I above illustrates a first loop unrolling, while Table II below illustrates the results of loop unrolling twice, where registers f1 through f10 are used for the most significant part of the approximation, and f11 thru f20 are used for the least significant (starts with the $x^{13}/13!$ term), and they are summed together at the end:

TABLE II

Instruction sequence with loop unrolling twice

```
# initially:
# f1, f2, f10 contain x
# f3, f4, f6, f8 contain 1.0
# f7 contains -1.0
# f11, f12, f20 contain x
# f13, f14, f16, f18 contain 1.0
# f17 contains -1.0
# end contains 5
loop:  fmul f2, f1, f2       # f1 contains x, initially f2 contains x also
       fmul f12, f11, f12    #
       fmul f2, f1, f2       # f2 now contains x raised to the desired exp
       fmul f12, f11, f12    #
       fadd f3, f3, f6       # increment the counter, initially contains 1
       fadd f13, f13, f16    #
       fmul f4, f3, f4       # f4 contains the running factorial, init 1
       fmul f14, f13, f14    #
       fadd f3, f3, f6       # increment the counter
       fadd f13, f13, f16    #
       fmul f4, f3, f4       # f4 contains the running factorial
       fmul f14, f13, f14    #
       fdiv f5, f6, f4       # f5 now has the reciprocal of the factorial
       fdiv f15, f16, f14    #
       fmul f8, f7, f8       # flip the sign appropriately
```

TABLE II-continued

Instruction sequence with loop unrolling twice

| | |
|---|---|
| fmul f18, f17, f18 | # |
| fmul f9, f5, f2 | # multiply the reciprocal with the x component |
| fmul f19, f15, f12 | # |
| fmadd f10, f9, f8, f10 | # correct the sign and add to the sum in f10 |
| fmadd f20, f19, f18, f20 | # correct the sign and add to the sum in f20 |
| fcmp f3, end | # compare counter (exponent) to end |
| blt loop | # branch back to loop if f3 < end |
| fadd f10, f10, f20 | # sum |

Note that in order to minimize branch mispredict penalties, minimize loops and for other performance reasons, it may be desirable to unroll further than two times. However, for brevity's sake the example shown above is only unrolled two times. Note that to unroll the loop 4 times, approximately 40 registers would be needed, which would push the limits of many architectures. Notice also in the example above that there is a long string of floating-point only instructions that have the same primary opcode. It will also be appreciated that other types of algorithms benefit from loop unrolling and large register files, e.g., rasterization, fast Fourier transforms, etc.

Embodiments consistent with the invention address the limitations of conventional instruction set architectures by avoiding placing all of the address bits of source and/or target register addresses directly in the operand portion of the instruction itself, and thus taking up valuable opcode space. Instead, consistent with the invention a portion of the address bits, e.g., the upper, most significant address bits, of one or more operands may be obtained from a portion in the instruction normally reserved for a primary opcode.

FIG. 6, for example, illustrates an exemplary instruction layout for a 3 source operand instruction where each register address LSB subset (VT1, VA1, VB1, VC1) is concatenated with each respective MSB subset, which resides in the portion of the instruction normally reserved for the primary opcode (VT0, VA0, VB0, VC0) leaving 3 bits for valuable secondary opcode space.

In this embodiment, the architecture may also include two architected registers referred to as an AIPO (Auxiliary Instruction Primary Opcode) register and an AIPOC (Auxiliary Instruction Primary Opcode Counter) register. The AIPOC register stores the number of instructions remaining where the primary opcode will be obtained from the AIPO register instead of the primary opcode portion of the instruction. The AIPO register stores the assumed primary opcode that decoder logic, e.g., an AXU decoder for an AXU floating point execution unit, uses if the AIPOC register is active, i.e., has a non-zero value. The AIPOC register is automatically decremented as each instruction is completed, such that when the AIPOC register reaches a zero value, the decode logic returns to decoding instructions using the primary opcode encoded in the primary opcode portion of such instructions. The exemplary architecture also desirably supports instructions that support moving to and from the AIPOC and AIPO registers to save and restore state during context switches, asynchronous interrupts, etc.

For example, FIG. 7 illustrates an exemplary processor 200 including an issue unit (IU) 202 and execution unit (XU) 204. Issue unit 202 includes instruction decode logic 206, dependency/issue logic 208 and full register address calculation logic 210. A count register 212 is initialized with a count in response to a move thereto, and a primary opcode register 214 is initialized with a primary opcode in response to a move thereto. Count register 212 is also capable of being decremented in response to execution of an instruction when the count register stores a non-zero value.

Instruction decode logic 206 is configured to output opcode data from a primary opcode portion of an instruction being decoded, along with a subset of the register address data from the operand portion of the instruction, to full register address calculation logic 210. Logic 210 in turn returns full register address data generated from the primary opcode and operand portions of the instruction to dependency/issue logic 208 such that when the instruction is issued to execution unit 204, the full operand address data is available during execution of the instruction.

Execution unit 204 may be implemented, for example, as an auxiliary execution unit such as a floating point unit configured to execute auxiliary instructions such as floating point instructions, and as such may include separate execution unit decode logic 216 configured to determine the operation to be performed for the instruction, e.g., by determining a primary opcode from either the primary opcode portion of the instruction, or, if in the extended register addressing mode, from the primary opcode register 214. In addition, a secondary opcode may also be decoded as appropriate from a secondary opcode portion of the instruction. In addition, in some embodiments, the primary opcode portion may be used to store secondary opcode data for an instruction when in the extended register addressing mode. It will be appreciated that the allocation of decode functionality between instruction decode logic 206 and execution unit decode logic 216 may differ in different embodiments (e.g., where the primary opcode is decoded in instruction decode logic 206 and the secondary opcode is decoded in execution unit decode logic 216), and that execution unit decode logic 216 may be omitted in some embodiments.

Execution unit decode logic 216 controls execution logic 218 to execute a decoded instruction, with source data from one or more operands supplied from a register file 220, with selection of the source registers in register file 220 performed by execution unit decode logic 216. Typically, execution of an instruction generates result data, which is then written back to a target or destination register as specified in the instruction.

FIG. 8 illustrates a sequence of operations 230 that are performed by processor 200 to decode an instruction for execution. The register addressing mode is determined in block 232, e.g., by determining whether a non-zero value is stored in the count register. If the extended register addressing mode is not enabled, e.g., if the count register stores a zero value, control passes to block 234 to calculate the register addresses from the operand portion of the instruction, in a conventional manner. Control then passes to block 236 to decode the opcode for the instruction from the primary opcode, and if present, the secondary opcode, encoded in primary and secondary opcode portions of the instruction, again in a conventional manner. The instruction is then prepared for execution.

Returning to block 232, if the extended register addressing mode is enabled, e.g., if a non-zero value is stored in the count register, control passes to block 238 to calculate the register addresses from the primary opcode and operand portions of the instruction. For example, as discussed above, in one exemplary embodiment the MSB of each operand may be encoded in the primary opcode portion of the instruction and the remaining LSB's may be encoded in the operand portion of the instruction, whereby calculation of the register addresses would incorporate concatenating the MSB and LSB's for each operand to generate the corresponding register address.

Next, in block 240, the opcode of the instruction is decoded using the data stored in the primary opcode register, thereby resulting in the primary opcode for the instruction decoded as different from that defined in the primary opcode portion of the instruction. In addition, any secondary opcode for the instruction may also be decoded, e.g., using data in a secondary opcode portion of the instruction and/or using data in the primary opcode portion of the instruction. Next, in block 242, the count register is decremented, and the instruction is prepared for execution.

As noted above, software may utilize the extended register addressing mode by first storing a primary opcode in a primary opcode register and storing a count in a count register, such that a number of subsequent instructions equal to the value stored in the count register will be decoded in the extended register addressing mode. In one example, illustrated by the sequence of operations 250 in FIG. 9, an instruction stream from a software program may include a first move instruction (block 252) that sets a primary opcode for the extended register addressing mode in the primary opcode register and a second move instruction (block 254) that sets a count value for the extended register addressing mode in the count register. Thereafter, as long as the count register stores a non-zero value (block 256), subsequent instructions in the instruction stream are decoded in the extended register addressing mode, i.e., with the primary opcode stored in the primary opcode register used as the primary opcode for the instruction, with any secondary opcode stored in a second opcode portion of the instruction used as the secondary opcode for the instruction, and with data from the primary opcode portion of the instruction used to calculate register addresses for one or more operands for the register (block 258). Upon execution of each such instruction, the count register is decremented (block 260). Once the number of instructions initially specified in the count register have been executed, the extended register addressing mode is disabled, and block 250 passes control to block 262 to decode subsequent instructions in the instruction stream in a normal register addressing mode, until the time that a non-zero value is again stored in the count register.

It will be appreciated that, upon exiting the extended register addressing mode, the primary opcode register may be reset in some embodiments. In other embodiments, however, it may be desirable to retain the primary opcode stored in the register such that subsequent instructions requiring the extended register addressing mode and having the same primary opcode can be decoded in the extended register addressing mode merely by writing to the count register, and avoiding the need to write to the primary opcode register a second time.

Thus, for example, returning to Table II above, in which a sequence of 20 fadd, fmul and fdiv instructions are executed, the sequence of 20 instructions may be preceded in an instruction stream by move instructions that store a primary opcode associated with the fadd, fmul and fdiv instructions in the primary opcode register and a count of 20 in the count register, such that the 20 instructions may be executed in extended register addressing mode. Moreover, by further unrolling the algorithm, and relying on a greater number of instructions that rely on a greater number of registers, it will be appreciated that a larger register file may be accessed by the instructions in the algorithm due to the extended register addressing mode.

Embodiments consistent with the invention therefore allow software to specify instructions that need not place the full source address in the instruction directly, thereby minimizing the impact of using available instruction decode space and allowing for larger registers to be addressed easily in a processor instruction.

Various modifications may be made to the illustrated embodiments. For example, decode logic consistent with the invention may be multithreaded, and an extended register addressing mode may only be enabled for selected threads or instruction streams. In addition, an extended register addressing mode may only be enabled for certain types of instructions, or for instructions that are executed by certain execution units, such that other instructions in an instruction stream may be decoded in a normal manner even when in the extended register addressing mode. Thus, for example, if a processor includes separate fixed point and auxiliary execution units, only instructions executed by one of the execution units may be decoded in the extended register addressing mode.

Other modifications may be made to the disclosed embodiments without departing from the spirit and scope of the invention. Therefore, the invention lies in the claims hereinafter appended.

What is claimed is:

1. A method of executing instructions in a processor of a type including an auxiliary execution unit, the method comprising:
  receiving first and second instructions from an instruction stream, wherein the first and second instructions are members of an instruction set architecture defined for the processor, and wherein each instruction in the instruction set architecture includes a primary opcode portion and an operand portion;
  in response to receiving the first and second instructions:
    decoding the first and second instructions by determining primary opcodes for each of the first and second instructions from the respective primary opcode portions thereof and determining at least one operand for each of the first and second instructions from the respective operand portions thereof;
    storing a primary opcode in a primary opcode register in response to decoding the first instruction; and
    storing a count in a count register in response to decoding the second instruction; and
  after receiving the first and second instructions, receiving a plurality of auxiliary instructions from the instruction stream, wherein a number of auxiliary instructions in the plurality of auxiliary instructions is equal to the count stored in the count register by the second instruction, wherein each of the plurality of auxiliary instructions includes a primary opcode portion that includes at least one bit used to decode an operand of such auxiliary instruction; and
  for each auxiliary instruction among the plurality of auxiliary instructions:
    determining that the count stored in the count register is a non-zero value;
    decoding a primary opcode for such auxiliary instruction based upon the primary opcode stored in the primary opcode register;
    decoding a secondary opcode for such auxiliary instruction from a secondary opcode portion of such auxiliary instruction, wherein the secondary opcode portion is different from the primary opcode portion;
    decoding a plurality of operands for such auxiliary instruction, wherein decoding the plurality of operands for such auxiliary instruction includes decoding first and second operands for such auxiliary instruction, wherein decoding the first operand includes concatenating at least one most significant bit for the first operand that is encoded in the primary opcode portion of such auxiliary instruction with a first plurality of least significant bits for the first operand encoded in an operand portion of such auxiliary instruction, and wherein decoding the second operand includes concatenating at least one most significant bit for the second operand that is encoded in the primary opcode portion of such auxiliary instruction with a second plurality of least significant bits for the second operand encoded in an operand portion of such auxiliary instruction, wherein a number of bits in the at least one most significant bit for the first operand is equal to a number of bits in the at least one most significant bit for the second operand;

executing such auxiliary instruction in the auxiliary execution unit using the primary opcode, secondary opcode and plurality of operands decoded from such auxiliary instruction; and decrementing the count stored in the count register.

2. A method of executing instructions from an instruction set architecture in a processor, wherein the instruction set architecture defines a primary opcode portion and an operand portion for each instruction in the instruction set architecture, the method comprising:

in response to receiving a first instruction in an instruction stream, the first instruction from the instruction set architecture:

decoding the first instruction with decode logic in the processor to determine a primary opcode for the first instruction from data encoded in the primary opcode portion thereof; and enabling a predetermined mode for the decode logic for at least one subsequent instruction; and in response to receiving a second instruction in the instruction stream, the second instruction from the instruction set architecture:

determining that the predetermined mode is enabled;

in response to determining that the predetermined mode is enabled, decoding a primary opcode for the second instruction that is different from a primary opcode defined by data encoded in the primary opcode portion thereof and decoding at least one operand for the second instruction using data encoded in the primary opcode portion of the second instruction, wherein the primary opcode portion of the second instruction is repurposed for use in decoding the at least one operand for the second instruction; and executing the second instruction based upon the decoded primary opcode for the second instruction and at least one operand thereof.

3. The method of claim 2, wherein the predetermined mode comprises an extended register addressing mode, and wherein the first instruction is a move instruction.

4. The method of claim 2, wherein enabling the predetermined mode comprises storing a count into a count register to specify a number of instructions in the instruction stream to decode in the predetermined mode.

5. The method of claim 4, further comprising decrementing the count stored in the count register in association with executing the second instruction, wherein determining that the predetermined mode is enabled includes determining that a non-zero count is stored in the count register.

6. The method of claim 5, further comprising disabling the predetermined mode in response to a zero value being stored in the count register.

7. The method of claim 2, wherein decoding the primary opcode for the second instruction that is different from the primary opcode defined by data encoded in the primary opcode portion thereof includes decoding the primary opcode for the second instruction using data stored in a primary opcode register.

8. The method of claim 7, further comprising, in response to receiving a third instruction that is earlier in the instruction stream than the second instruction:

decoding the third instruction with the decode logic to determine a primary opcode for the third instruction from data encoded in the primary opcode portion thereof; and storing a primary opcode in the primary opcode register, wherein decoding the primary opcode for the second instruction using the data stored in the primary opcode register comprises using the primary opcode stored in the primary opcode register as the primary opcode for the second instruction.

9. The method of claim 2, wherein decoding at least one operand for the second instruction using data encoded in the primary opcode portion of the second instruction includes generating a first register address for a first operand for the second instruction using at least one bit in the primary opcode portion of the second instruction.

10. The method of claim 9, wherein generating the first register address includes concatenating at least one bit in the primary opcode portion of the second instruction with a plurality of bits in the operand portion of the second instruction.

11. The method of claim 10, wherein concatenating at least one bit in the primary opcode portion of the second instruction with a plurality of bits in the operand portion of the second instruction includes using the at least one bit in the primary opcode portion as a most significant bit of the first register address.

12. The method of claim 2, wherein the second instruction includes a plurality of source operands and a destination operand, and wherein decoding at least one operand for the second instruction includes decoding the plurality of source operands and the destination operand for the second instruction by generating a register address for each source and destination operand by, for each source and destination operand, concatenating at least one bit from the primary opcode portion of the second instruction with a plurality of bits from the operand portion of the second instruction.

13. The method of claim 2, further comprising decoding a secondary opcode for the second instruction from a secondary opcode portion of the second instruction, wherein executing the second instruction is further based upon the decoded secondary opcode.

14. A circuit arrangement, comprising:

a processor configured to execute instructions from an instruction set architecture, wherein the instruction set architecture defines a primary opcode portion and an operand portion for each instruction in the instruction set architecture; and decode logic disposed in the processor, wherein the decode logic is configured to:

in response to receiving a first instruction in an instruction stream, the first instruction from the instruction set architecture:

decode the first instruction to determine a primary opcode for the first instruction from data encoded in the primary opcode portion thereof; and enable a predetermined mode for at least one subsequent instruction; and in response to receiving a second instruction in the instruction stream, the second instruction from the instruction set architecture:

determine that the predetermined mode is enabled; and in response to determining that the predetermined mode is enabled, decode a primary opcode for the second instruction that is different from a primary opcode defined by data encoded in the primary opcode portion thereof and decode at least one operand for the second instruction using data encoded in the primary opcode portion of the second instruction, wherein the primary opcode portion of the second instruction is repurposed for use in decoding the at least one operand for the second instruction; and execution logic disposed in the processor and configured to execute the second instruction based upon the decoded primary opcode for the second instruction and at least one operand thereof.

15. The circuit arrangement of claim 14, wherein the predetermined mode comprises an extended register addressing mode, and wherein the first instruction is a move instruction.

16. The circuit arrangement of claim 14, wherein the predetermined mode is enabled in response to storing a count into a count register to specify a number of instructions in the instruction stream to decode in the predetermined mode.

17. The circuit arrangement of claim 16, wherein the decode logic is further configured to decrement the count stored in the count register in association with execution of the second instruction, and wherein the predetermined mode is enabled in response to a non-zero count being stored in the count register.

18. The circuit arrangement of claim 14, wherein the decode logic is configured to decode the primary opcode for the second instruction that is different from the primary opcode defined by data encoded in the primary opcode portion thereof by decoding the primary opcode for the second instruction using data stored in a primary opcode register.

19. The circuit arrangement of claim 18, wherein the processor is configured to store a primary opcode in the primary opcode register in response to execution of a third instruction that is earlier in the instruction stream than the second instruction, and wherein the decode logic is configured to decode the primary opcode for the second instruction using the primary opcode stored in the primary opcode register as the primary opcode for the second instruction.

20. The circuit arrangement of claim 14, wherein the decode logic is configured to decode at least one operand for the second instruction using data encoded in the primary opcode portion of the second instruction by generating a first register address for a first operand for the second instruction using at least one bit in the primary opcode portion of the second instruction.

21. The circuit arrangement of claim 20, wherein the decode logic is configured to generate the first register address by concatenating at least one bit in the primary opcode portion of the second instruction with a plurality of bits in the operand portion of the second instruction, with the at least one bit in the primary opcode portion used as a most significant bit of the first register address.

22. The circuit arrangement of claim 14, wherein the second instruction includes a plurality of source operands and a destination operand, and wherein the decode logic is configured to decode at least one operand for the second instruction by decoding the plurality of source operands and the destination operand for the second instruction by generating a register address for each source and destination operand by, for each source and destination operand, concatenating at least one bit from the primary opcode portion of the second instruction with a plurality of bits from the operand portion of the second instruction.

23. The circuit arrangement of claim 14, wherein the decode logic is further configured to decode a secondary opcode for the second instruction from a secondary opcode portion of the second instruction such that the second instruction is executed further based upon the decoded secondary opcode.

24. An integrated circuit device including the circuit arrangement of claim 14.

* * * * *